Jan. 23, 1923.                                                                                              1,442,813
                                    J. M. LOBIT.
                        COMBINED CANE AND FISHING IMPLEMENT.
                              FILED APR. 27, 1921.
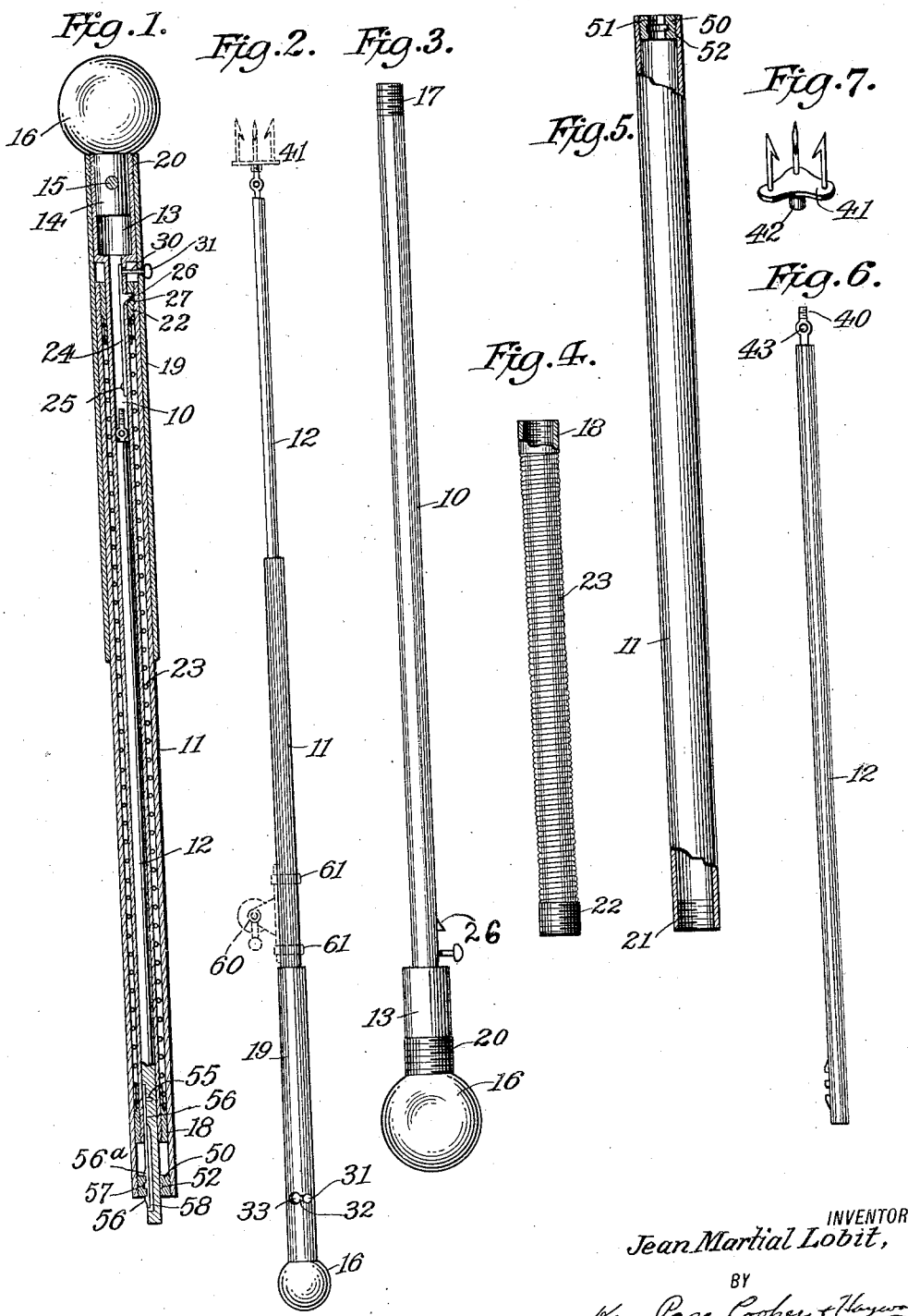
INVENTOR
Jean Martial Lobit,
BY
Kerr, Page, Cooper & Hayward
his ATTORNEYS Patented Jan. 23, 1923.

1,442,813

UNITED STATES PATENT OFFICE.

JEAN MARTIAL LOBIT, OF BROOKLYN, NEW YORK.

COMBINED CANE AND FISHING IMPLEMENT.

Application filed April 27, 1921. Serial No. 464,960.

*To all whom it may concern:*

Be it known that I, JEAN MARTIAL LOBIT, being a citizen of the United States, residing at Brooklyn, county of Kings, and State of New York, have invented certain new and useful Improvements in Combined Cane and Fishing Implements, of which the following is a full, clear, and exact description.

This invention relates to fishing implements and has for one of its principal objects to provide a rod which, though of comparatively great length when extended, can be collapsed or telescoped to a compact form and used as a cane or walking stick.

Another object is to provide means, controllable at will, whereby certain parts of the device are automatically extended.

A further object is to provide a device which may be employed as a cane, fishing rod or fishing spear. Other objects and advantages will appear as the invention is hereinafter disclosed.

Referring to the drawings which illustrate what I now consider a preferred form of my invention, Fig. 1 is a longitudinal section showing the device collapsed for use as a cane.

Fig. 2 is a view showing the device extended for use as a fishing implement.

Figs. 3, 5 and 6 are detail views of three sections of the device respectively.

Fig. 4 is a detail view of a spring employed to bias certain of the sections to extended position.

Fig. 7 is a perspective view of a type of spear head which may be employed.

While the device may be provided with any desired number of sections I have disclosed three in the present case. For convenience I shall hereinafter refer to these three as the butt section 10, the mid section 11 and the tip section 12. The butt section 10 consists of a sleeve provided at one end with an enlargement 13 which receives the stud 14 of a knob or head 16. The stud may be secured to said enlargement 13 in any suitable manner as, for example, by means of a through pin 15. The opposite end of the butt section 10 is shown externally screw-threaded at 17 to receive an internally screw-threaded bushing 18. The butt section comprises also a sleeve 19 surrounding the sleeve 10 throughout a portion of the length of the latter but spaced therefrom, for purposes which will hereinafter appear. The sleeve 19 is shown secured to the enlargement 13 by means of cooperating screw-threads 20 provided on these two parts.

The mid section 11 consists of a sleeve, internally threaded at one end, as at 21, to receive an externally threaded bushing 22. The member or mid section 11 is of such internal diameter as to form a sliding fit with the bushing 18 and the bushing 22 is of such internal diameter as to form a sliding fit with the exterior of the butt member 10. The exterior of the section 11 forms a sliding fit with the interior of the sleeve 19. By virtue of this construction it will be appreciated that the section 11 is slidable with respect to the butt section 10 from the position shown in Fig. 1 to that shown in Fig. 2.

The sections 10 and 11 are preferably biased to the position shown in Fig. 2, i. e., to extended position, by means of a tension spring 23, the opposite ends of which are secured respectively to the bushings 18 and 22. As shown in Fig. 1 the spring is extended and under tension and tends to cause the parts 10 and 11 to extend or move away from each other. Fig. 4 shows the spring collapsed which is the condition it assumes when the parts 10 and 11 occupy the relative position illustrated in Fig. 2. Means are provided for releasably holding the parts 10 and 11 in the position shown in Fig. 1 against the tension of the spring 23. One form of such means is shown in the drawings and may be constructed substantially as follows:

A leaf spring 24, riveted or otherwise secured at 25 to the interior of the member 10, is provided with a catch or lug 26, beveled on one edge and which is operable through an opening in said member 10 to engage at notch 27 provided in the collar 22. When the sections 10 and 11 are moved from extended position to the position shown in Fig. 1, the collar 22 pushes the lug 26 inwardly until the lug comes opposite the notch in the collar at which time it snaps into the notch to lock the parts in the compact position. In order to release this locking engagement of the parts, the leaf-spring 24 has secured thereto a push rod 30 which extends through an opening in the member 10 and through a slot 32 in the sleeve 19, and has secured thereto at its outer end a push button 31. The slot 32 is of such design that when the button 31 is in the position shown in Figs. 1 and 2 it cannot be depressed inadvertently or otherwise to release the catch 26. The slot 32 is provided with an enlarged portion 33 through which the button 31 is adapted to pass when in the proper position for this operation.

While the tip section 12 of the device may also be in the form of a sleeve I have shown it in the form of a rod. This section 12 is of such diameter as to fit within the butt section 10 and be readily capable of being withdrawn therefrom. The tip section is shown provided at one end with an externally screw-threaded portion 40 adapted to screw into the shank 42 of a spear head 41 and also with an eye 43 to serve as a guide for a fishing line. The opposite end of the tip section 12 and one end of the mid section 11 are provided with means for detachably securing them together. One form of such means is illustrated in the drawings and may be constructed substantially as follows.

The mid section 11 is provided at its outer end with internal screw-threads adapted to receive an externally threaded bushing 50. This bushing is provided with an internal bore 51 having a recess, which bore, throughout its major portion, is of such diameter, with respect to the outer diameter of the tip section 12, as to form a snug fit therewith. One end of the section 12 has secured thereto at 55 a leaf spring 56 provided with lugs or shoulders 56ª, adapted to engage the opposite ends of the bushing 50; and a lug 57 adapted to seat in an annular recess or under-cut in the bore 51 of the bushing. The last described parts are shown in one of the locked positions in Fig. 1. To permit release of these parts, the section 12 is provided with a slot 58 into which the leaf-spring 56 may be depressed sufficiently to disengage the lugs 56, 57 from the bushing 50 and to permit removal of the section 12 from the section 11.

A fishing reel, shown in dotted lines in Fig. 2, may be detachably secured to the section 11 or to the sleeve 19 by means of rings 61. These rings may in turn be detachably secured to the sleeve 19 or section 11 in any suitable manner such, for example, as by friction or by the employment of the set screw arrangement illustrated in connection with the ring C shown in Fig. 1 of my U. S. Patent No. 849,481, issued upon application Serial No. 324,681. The operation of the device may be described as follows.

When used as a cane or walking stick the parts are in the relative positions shown in Fig. 1. If it is desired to employ the device as a short rod, fishing implement the tip section 12 may be withdrawn from the mid section 11 after the depression and release of the leaf-spring 56 from the bushing 50. The section 12 is then turned end for end and inserted into the bushing 50. The lugs 56ª, 57 are permitted to snap into engagement with the bushing 50 and its recess 52, thereby locking the sections 12 and 11 together in the position shown in Fig. 2. If it is desired further to lengthen or extend the rod, this may be accomplished as follows. The knob 16 is grasped and turned in the proper direction with respect to the sleeve 19 until the button 31 is in position to enter the opening 33. Depression of the button 31 then releases the catch 26 from the notch in the collar 22 and the spring 23 automatically causes the section 11 (and the section 12 carried thereby) to move away from the butt section until the parts 10, 11 occupy the relative position shown in Fig. 2, with spring 23 as shown in Fig. 4. If it is desired to employ the device as a spear the spear-head 41 may be screwed onto the tip 40, as shown in dotted lines in Fig. 2. If it is desired to use the device as a fishing rod or pole the reel 60 may be attached to the same, the line passing through the eyelet 43.

The modus operandi in restoring the device to the collapsed position illustrated in Fig. 1 will be readily understood by those skilled in the art in view of the foregoing disclosure, as will also the assembly and disassembly of the device when it is borne in mind that the button 31 is adapted to pass through the opening 33.

All of the parts of the device may be, and preferably are, constructed of suitable metal. The device presents a neat compact appearance, is comparatively simple and easy to manufacture in view of the number of functions performed. In accordance with the patent statutes, I have herein illustrated what I now consider a preferred form of the invention. It is to be understood that it is susceptible to modification as to construction, operation and use within the scope defined in the following claims.

What I claim is:—

1. A combined fishing implement and cane including in combination, a cane head, two telescoping sections adapted to occupy a position in which they are relatively extended and another position in which they are collapsed, means biasing said sections to one of said positions, and manually releasable means operable from a position adjacent said cane head for holding said sections in the other of said positions against the action of said biasing means.

2. A combined fishing implement and cane comprising in combination, a cane head, a plurality of tubular telescoping sections adapted to occupy relatively extended and collapsed positions, a tip section adapted to be stored within one of said tubular sections and provided with means whereby it may be secured to an end of one of said tubular sections as desired, manually releasable means operable from a position adjacent said cane head for holding two of said sections in collapsed position, and means for automatically extending said last mentioned sections when the release is effected.

3. A combined fishing implement and cane including in combination, two telescopic sections, manually releasable means for holding said sections in relatively collapsed position when the device is employed as a cane, and means comprising a spring for automatically projecting one of said sections from the other, and for automatically holding said section in its fully projected position when the release has been effected.

In testimony whereof I hereto affix my signature.

JEAN MARTIAL LOBIT.